United States Patent
Hutsell et al.

(10) Patent No.: US 7,468,857 B2
(45) Date of Patent: Dec. 23, 2008

(54) ACCELERATION FEED-FORWARD CORRECTION ENABLED OR DISABLED BASED ON TRACK FOLLOW LOOP SIGNALS

(75) Inventors: Larry Hutsell, Loveland, CO (US); Dave Finamore, Louisville, CO (US); Farhad Navid, Boulder, CO (US)

(73) Assignee: Maxtor Corporation, Scotts Valley, CA (US)

( * ) Notice: Subject to any disclaimer, the term of this patent is extended or adjusted under 35 U.S.C. 154(b) by 62 days.

(21) Appl. No.: 11/705,518

(22) Filed: Feb. 9, 2007

(65) Prior Publication Data

US 2007/0188909 A1 Aug. 16, 2007

Related U.S. Application Data

(60) Provisional application No. 60/772,239, filed on Feb. 10, 2006.

(51) Int. Cl.
*G11B 21/10* (2006.01)
*G11B 5/596* (2006.01)

(52) U.S. Cl. .................................. 360/77.03
(58) Field of Classification Search ............... None
See application file for complete search history.

(56) References Cited

U.S. PATENT DOCUMENTS

| | | | |
|---|---|---|---|
| 5,299,075 A | 3/1994 | Hanks | |
| 5,521,772 A | 5/1996 | Lee et al. | |
| 5,663,847 A | 9/1997 | Abramovitch | |
| 6,125,000 A | 9/2000 | Carlson et al. | |
| 6,538,839 B1* | 3/2003 | Ryan | 360/77.02 |
| 6,580,579 B1* | 6/2003 | Hsin et al. | 360/77.02 |
| 6,674,600 B1 | 1/2004 | Codilian et al. | |
| 6,710,966 B1* | 3/2004 | Codilian et al. | 360/77.02 |
| 6,760,185 B1 | 7/2004 | Roth et al. | |
| 6,914,743 B1 | 7/2005 | Narayana et al. | |
| 6,937,423 B1* | 8/2005 | Ngo et al. | 360/77.03 |
| 6,999,260 B2* | 2/2006 | Abe et al. | 360/75 |
| 7,035,034 B2* | 4/2006 | Semba et al. | 360/77.03 |
| 7,088,546 B2* | 8/2006 | Ehrlich | 360/77.03 |
| 7,141,951 B2* | 11/2006 | Hosono et al. | 360/75 |
| 7,145,307 B2* | 12/2006 | Hosono et al. | 360/75 |
| 7,177,113 B1* | 2/2007 | Semba et al. | 360/77.07 |
| 7,265,931 B2* | 9/2007 | Ehrlich | 360/77.03 |
| 2004/0257693 A1* | 12/2004 | Ehrlich | 360/77.02 |
| 2007/0070540 A1* | 3/2007 | Noguchi et al. | 360/75 |

* cited by examiner

*Primary Examiner*—Hoa T Nguyen
*Assistant Examiner*—James L Habermehl
(74) *Attorney, Agent, or Firm*—Foley & Lardner LLP

(57) ABSTRACT

Disturbances to actuator control caused by external vibrations are corrected using feed-forward techniques that are selectively enabled or disabled based on signal values within a track follow loop. An increase in data integrity and reliability may be achieved by reducing off-track reads and writes caused by physical disturbances to disk drives during operation. Accelerometers detect external forces imparted on a disk and an acceleration feed-forward (AFF) signal is generated to compensate for disturbances to the location of a head caused by such external forces. Application of the AFF signal to an actuator may be based on whether signal values along the track follow loop exceed a certain threshold.

19 Claims, 4 Drawing Sheets

ACCELERATION FEED-FORWARD CORRECTION ENABLED OR DISABLED BASED ON TRACK FOLLOW LOOP SIGNALS

CROSS-REFERENCE TO RELATED PATENT APPLICATIONS

Embodiments of the present invention relate to U.S. Provisional Application Ser. No. 60/772,339, filed Feb. 10, 2006, entitled "Vibration Detection for Acceleration Feed-Forward System", the contents of which are incorporated by reference herein and which is a basis for a claim of priority.

BACKGROUND

Embodiments of the present invention relate generally to control systems, such as those used in magnetic storage systems and methods and, in specific embodiments, to systems and methods that correct for disturbances to coarse actuator control caused by external vibrations using feed-forward techniques that are selectively enabled or disabled based on track follow loop signals.

Magnetic storage systems, such as disk drives, are widely used in computers and other electronic devices for the storage and retrieval of data. Important design considerations for disk drive manufacturers generally include: (a) data storage capacity; (b) data transfer rate; (c) data integrity and reliability; and (d) manufacturing cost.

In general, related art disk drives comprise one or more disks for storing data, an actuator arm, and one or more transducers or heads. Each head is operable to read data from and write data to concentric circular tracks on a surface of a corresponding disk. The heads are typically attached to the actuator arm, and when a head performs a read or a write operation, the actuator arm is moved so that the head is positioned over the center of a selected track to perform the desired operation.

In recent years, disk drive manufacturers have sought to increase the data storage capacity of disk drives while controlling the manufacturing cost. One solution has been to increase track density by increasing the number of tracks per inch (TPI) on each disk. As TPI has increased, tracks have become narrower, and maintaining data integrity has become a greater design challenge because data errors can occur with smaller amounts of movement of a head away from a track center during a read or a write operation.

Movement of a head away from a track center can lead to an off-track read or an off-track write. An off-track read occurs when a head is positioned over a wrong track during a read operation and the head reads data from the wrong track. In such an instance, the incorrect data would have to be discarded, the head repositioned over the correct track, and the head would then have to read in the correct data. As a consequence, the data transfer rate of the disk drive would be reduced, because the time spent reading the wrong data would be wasted. Even worse than an off-track read is an off-track write. An off-track write occurs when a head is positioned over a wrong track during a write operation and the head writes data to the wrong track. As a result of an off-track write, data integrity is adversely affected, because existing data on the wrong track is improperly overwritten and is potentially lost.

Thus, to prevent data errors, it is preferable to maintain a head over a center of a selected track during a read or a write operation. In order to position a head during a read or a write operation, related art disk drives typically comprise a servo controller and have embedded servo sectors located in the tracks of each disk. The embedded servo sectors are located between data sectors and contain predetermined patterns from which a position of a head during an operation can be determined.

During read and write operations to a selected track, a head reads data from embedded servo sectors of the selected track and provides the data read from the embedded servo sectors as servo information to a servo controller. The servo controller receives the servo information provided by the head and determines a position error signal (PES) from the servo information. The PES is indicative of the position of a head relative to the center of the selected track. The PES is then fed into a compensator that produces an appropriate compensation signal so that the actuator arm will reposition closer to the center of the selected track. Once the actuator arm is repositioned, the process repeats as the head again reads data from the embedded servo sectors and provides updated positional information to the servo controller. This interplay between the PES, compensator, and the positional information regarding the actual location of the head, form the track follow loop.

When operating in various environments, a disk drive may be subject to various external forces in the form of vibrations or shocks. Depending on the intensity and direction of these external forces, the actuator arm and head assembly can become displaced from their desired location over the center of a track. Translational forces will not have a significant impact on the position of the head if the actuator arm assembly is balanced. However, rotary forces acting in the plane of the disk may cause considerable head displacement. Although convergence of the track follow loop does provide some protection against such displacement by eventually repositioning the head over the center of the track, the loop has a finite response time that might be too slow to correct for certain vibratory or other forces acting on the disk drive.

It has been proposed to use accelerometers to sense disruptive forces acting on a disk drive. The accelerometers generate signals representative of the intensity and direction of the forces acting on a disk drive, and these signals in turn can be used in a feed-forward architecture to make the disk drive more robust to such forces.

Various types of accelerometers, for example linear accelerometers and angular accelerometers, have been used in such compensatory schemes. Linear accelerometers detect forces acting in one direction (translational forces), whereas angular accelerometers detect rotational forces acting within some plane. As mentioned before, translational forces are not a particular threat to balanced actuator arm assemblies, and thus angular accelerometers are more useful. However, linear accelerometers may also be used in pairs to detect rotational force. The signal difference between two linear accelerometers affixed at opposite ends of a disk drive will yield a value close to zero in the presence of translational force since both accelerometers will notice acceleration in the same direction. However, in the presence of rotational force, each accelerometer will notice acceleration equal and opposite of the other since at any given moment they will be accelerating in opposite directions. Thus, in the presence of rotational force, the absolute value of the signal difference will constructively add.

Forces acting normal to the plane of rotation (z-axis) of disks of a disk drive are not a particular source of concern because the actuator arm assembly and head will not be displaced in a direction along the plane of disk rotation (x-y axes). Therefore, rotational accelerometers or linear accelerometers will be positioned such that their directions of sensitivity are parallel to the plane of the disk. Otherwise, the correctional information these accelerometers provide will contain components pertaining to disturbances parallel to the z-axis—information that may mislead the acceleration feed-forward system in trying to correct for a disturbance that is actually not affecting the position of the head.

Ideally, an accelerometer that is situated so as to only detect motion in the x-y axis will not generate a signal in response to forces being imparted on it from the z-axis. In reality however, an accelerometer situated so as to only detect motion in the x-y axis may still generate non-zero signal information in response to forces directed from the z-axis. In response to such signal information, an acceleration feed-forward system may move the head in order to compensate for what it erroneously thinks to be a threatening disturbance within the plane of the disk. In this way the acceleration feed-forward system can become a source of noise itself, and make it more difficult for the head to converge onto the center of the selected track. In extreme situations, this noise can cause off-track read or write errors, which is unacceptable.

SUMMARY OF THE DISCLOSURE

Embodiments of the present invention relate to correcting for disturbances to actuator control caused by external vibrations using feed-forward techniques that are selectively enabled or disabled based on signal values within a track follow loop. Particular embodiments may increase data integrity and reliability by reducing off-track reads and writes caused by physical disturbances to disk drives during operation.

Embodiment of the invention provide an AFF signal to compensate for any disturbances to a position of a head of a storage system relative to a selected track of a storage medium. In such embodiments, an AFF system may include an acceleration feed-forward (AFF) unit configured to selectively provide an AFF signal based on track follow loop signal samples. In further embodiments, the AFF unit is configured to selectively provide an AFF signal based on whether a storage system employing the acceleration feed-forward (AFF) system is in a read or write retry state. The AFF system further includes a track follow system for at least partially controlling motion of an actuator relative to the selected track of the storage medium, based on the AFF signal.

Further embodiments of the present invention relate to a method for providing an acceleration feed-forward (AFF) signal to compensate for any disturbances to a position of a head of a storage system relative to a selected track of a storage medium. In such embodiments, the method includes selectively providing an AFF signal based on (i) track follow loop signal samples and/or (ii) whether a storage system employing the method is in a read or write retry state. The method also includes at least partially controlling motion of an actuator relative to the selected track of the storage medium, based on the acceleration feed-forward (AFF) signal.

Yet further embodiments relate to storage systems and methods that include or employ an AFF system or method as described herein. Such embodiments of the present invention may include or employ a disk, a head, an actuator, a servo controller, accelerometers, and an AFF system as described herein. A surface of the disk has one or more tracks that include data sectors and servo sectors. The actuator allows for positioning of the head over a selected track of the one or more tracks of the disk. As the disk rotates, the head may read or write data information to the data sectors within a track. The head may also read servo sector information and relay that information to the servo controller. This information tells the servo controller the position of the head relative to the disk and to a given track. This information also serves to generate a position error signal that may be used to converge the head over the center of the desired track. The accelerometers provide signal information pertaining to forces acting within the plane of the disk to the acceleration feed-forward system. The acceleration feed-forward system generates a corresponding acceleration feed-forward signal that, when enabled, may correct the position of the actuator arm so as to compensate for any undesired displacement of the head caused by the forces. Embodiments may be used to control a course actuator arm. In other embodiments, the acceleration feed-forward signal may correct the position of a fine position actuator, such as, but not limited to a microactuator.

DETAILED DESCRIPTION OF PREFERRED EMBODIMENTS

Figure 1:
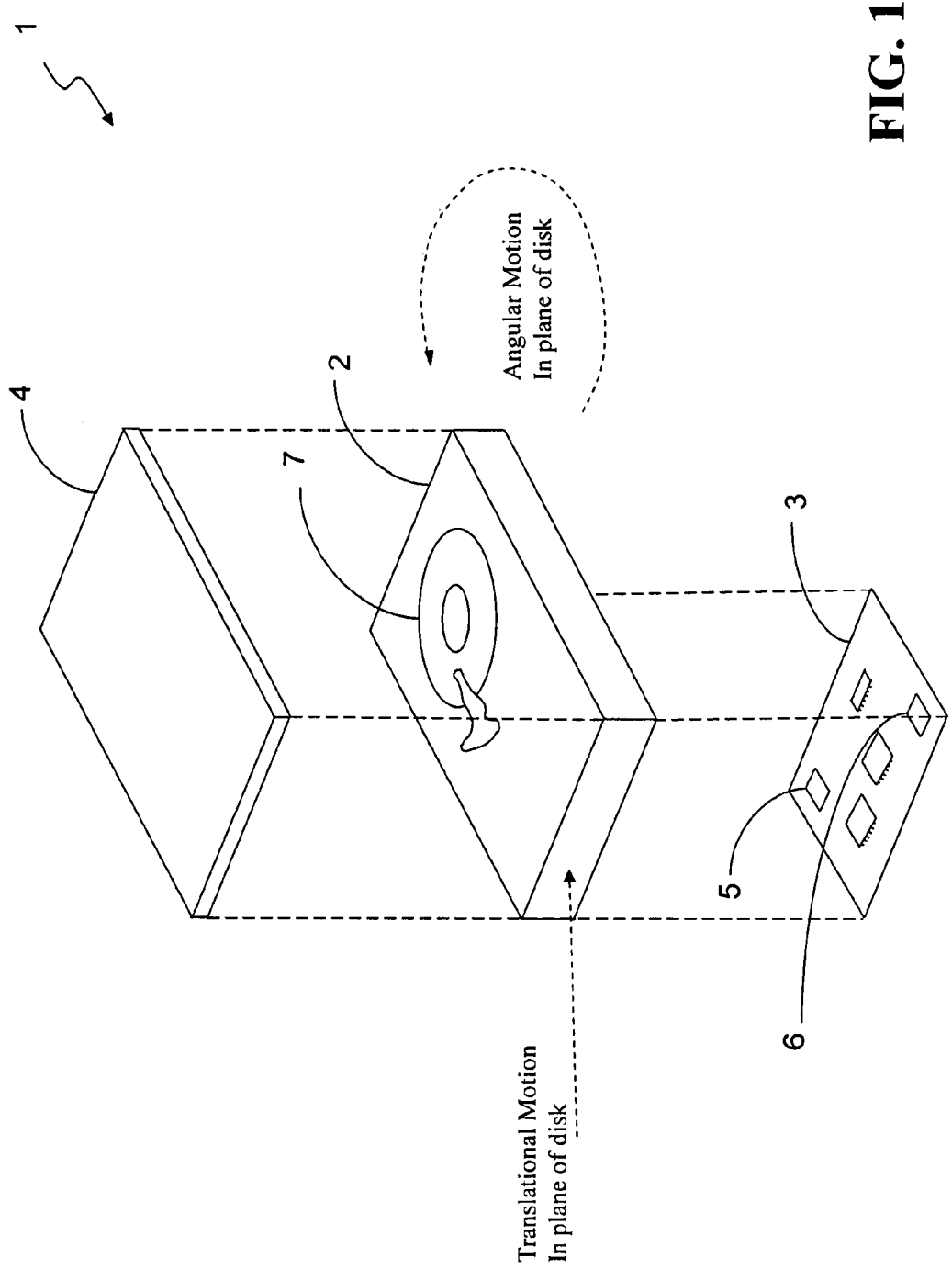
FIG. 1 illustrates an exploded perspective view of a disk drive of an embodiment of the present invention.

FIG. 1 illustrates an exploded three dimensional perspective view of a disk drive 1 of an embodiment of the present invention. The disk drive 1 comprises a base 2, a printed circuit board assembly (PCBA) 3, and a cover plate 4. The PCBA 3 contains suitable control electronics and is rigidly mounted to an underside of base 2. The cover plate 4 encloses essential components of the disk drive 1 in a cavity within the base 2 by attaching to the top side (the side opposite the PCBA 3) of the base 2.

The disk drive 1 further comprises motion sensors 5 and 6 that are rigidly mounted relative to the base 2 such that the sensors 5 and 6 move with the base 2. In FIG. 1, the sensors are mounted to the PCBA 3, which in turn is rigidly mounted to the base 2. It is possible, of course, to mount any one of the sensors 5 and 6 directly to the base 2, or to mount them to any other structure that is rigidly attached to the base 2.

The sensors 5, 6 may comprise, for example, piezoelectric linear accelerometers, or the like, and may be located at opposite ends of the PCBA 3. These sensors 5 and 6 are oriented relative to each other so that the differential of the their signals will be ideally zero when the disk drive 1 is subjected to translational motion, and their outputs will constructively add in the presence of angular motion in the plane of the disk 7. Since the purpose of the sensors 5 and 6 are to provide the disk drive 1 with information regarding angular motion in the plane of the disk 7, any number of sensors may be used of varying types in accordance with this invention, not limited to piezoelectric linear accelerometers. These variations include angular sensors, or other types of multi-axis sensors. Such sensors and their various arrangements to detect motion in the plane of disks of a disk drive are well known to those of ordinary skill in the art.

Figure 2:
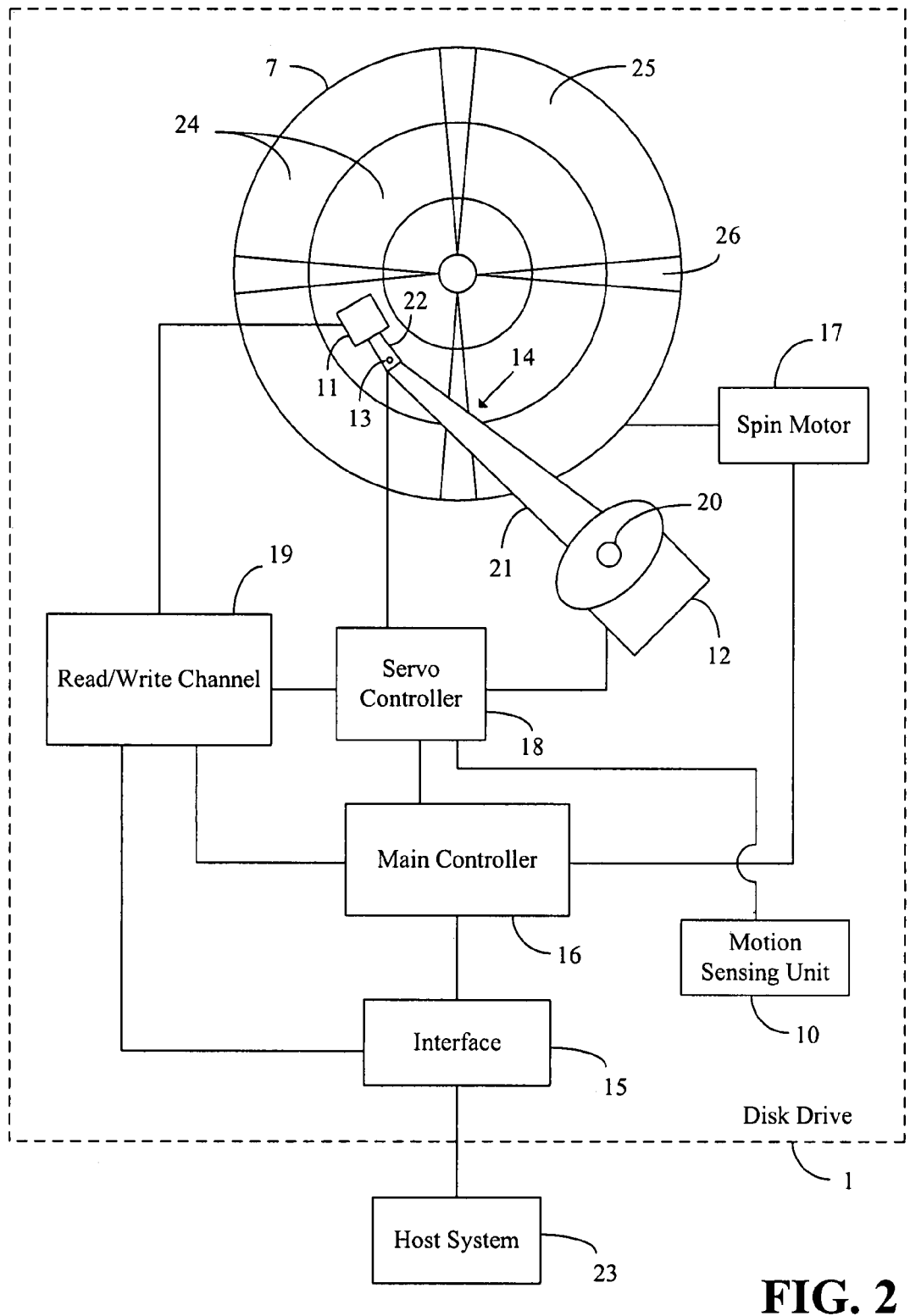
FIG. 2 illustrates a functional block diagram of a disk drive of an embodiment of the present invention in communication with a host system.

FIG. 2 illustrates a functional block diagram of the disk drive 1 in communication with a host system 23 in accordance with an embodiment of the present invention. The disk drive 1 comprises a disk 7, a transducer or head 11, a coarse actuator 12, a microactuator 13, an actuator arm assembly 14, an interface 15, a main controller 16, a spin motor 17, a servo controller 18, a read/write (r/w) channel 19, and a motion sensing unit 10.

The head 11 is mounted on one end of the actuator arm assembly 14, and another end of the actuator arm assembly 14 is connected to the base 2 (FIG. 1) of the disk drive 1 by a bearing 20. The actuator arm assembly 14 comprises a first member 21 and a second member 22 that are interconnected by the microactuator 13. During operation, the disk 7 spins around a central axis, and the head 11 reads data from or writes data to a surface of the disk 7. The coarse actuator 12 rotates the actuator arm assembly 14 about the bearing 20 in order to control a position of the microactuator 13 and the head 11 over the disk 7. The microactuator 13 moves the second member 22 of the actuator arm assembly 14 to position the head 11 over the disk 7.

The coarse actuator 12 may comprise a motor, such as a voice coil motor (VCM) or the like, and may provide for coarse positioning of the head 11 over the disk 7. The microactuator 13 may comprise, for example, a piezoelectric actuator, an electromagnetic actuator, an electrostatic actuator, or the like. The microactuator 13 may provide for fine positioning of the head 11 over the disk 7. A range of movement of the microactuator 13 may be small, such as moving the head 11 across a few tracks, while a range of movement of the coarse actuator 12 may be large, such as moving the head 11 across all tracks on the disk 7. Other embodiments of the present invention may employ different disk drive configurations than that of the example shown in FIG. 2, including, but not limited to disk drive configurations which do not employ microactuators 13.

The disk drive 1 is not limited to having only a single disk 7, but may have a plurality of disks. Also, data may be written to both a top surface and a bottom surface of each disk, in which case a different head is required for each surface. The head 11 may have a single element for performing both reading and writing, or the head 11 may have separate elements for performing each of those operations, in which case the head 11 would comprise a read element and a write element.

In the following discussion, portions of the disk drive 1 are described with reference to functional blocks and not discrete hardware elements. The functions may be implemented using one or more of hardware, software, and firmware. In addition, more than one function, or different parts of functions, may be combined in a given hardware, software, or firmware implementation.

When the disk drive 1 is connected to the host system 23, the interface 15 communicates with the host system 23 to receive, for example, data and commands, and to send, for example, data and status identifiers. The interface 15 also communicates with the main controller 16 and the r/w channel 19 to send and receive, for example, data and commands. When the main controller 16 receives a command from the interface 15 for a read or a write operation, the main controller 16 provides a signal to the spin motor 17 to cause the disk 7 to spin.

As shown in FIG. 2, the disk 7 has one or more tracks 24 for storing data. Each of the tracks 24 has a plurality of data sectors 25 and a plurality of embedded servo sectors 26. During operation of the disk drive 1, a data block may be read from or written to a data sector of the plurality of data sectors 25. The plurality of embedded servo sectors 26 are written with servo patterns or data that are used for determining a position of the head 11 with respect to a track of the one or more tracks 24.

The disk drive 1 is able to perform the operations of seeking and tracking. When the main controller 16 receives a read or write request from the host system 23 (via the interface 15), it may instruct the servo controller 18 to move the head 11 to a different track location so that the r/w channel 19 may initiate the read or the write. During this move from one track to another, the disk drive 1 is in seeking mode, and ideally, the head 11 comes to a rest directly over the center of the selected track. In reality, however, the head 11 may overshoot the desired track, requiring time for the head 11 to settle into the desired location.

When the servo controller 18 determines that the head 11 has settled over the selected track, the disk drive 1 is said to be in tracking mode, and the servo controller 18 may send a signal to the r/w channel 19 to start a read or write operation. It is also possible that the servo controller 18 sends the signal to the main controller 16, rather than to the r/w channel 19, in which case the main controller 16 would then send the signal to the r/w channel 19. The r/w channel 19 also receives a command from the main controller 16 that specifies the type of operation to be performed. In the case of a read operation, the r/w channel 19 causes the head 11 to read the data and then sends the data to either the interface 15 or the main controller 16. In the case of a write operation, the r/w channel 19 receives data from either the interface 15 or the main controller 16 and causes the head 11 to write the data.

The servo controller 18 also receives information from the motion sensing unit 10. In an embodiment of the present invention, the motion sensing unit 10 comprises the linear accelerometer motion sensors 5 and 6 (FIG. 1), an analog to digital converter (A/D) (not shown) and various filters (not shown). A signal indicating a difference between the two linear accelerometers 5 and 6 is directly correlated to an angular displacement of the disk drive 1, when the disk drive 1 is being subjected to a force in the plane of the disk 7. This signal may then be digitized using an A/D, and then notch filtered to remove any resonant frequencies and noise inherent to the accelerometers themselves. The signal may also be gained appropriately for proper interfacing with the servo controller 18. Again, the angular displacement signal may be generated using any number of and types of accelerometers, not limited to two linear accelerometers discussed herein. Moreover, the signal processing steps of digitizing and filtering the outputs of the motion sensors 5 and 6 are not limited to the techniques or order described above, as other types of filters may also be applied.

Figure 3:
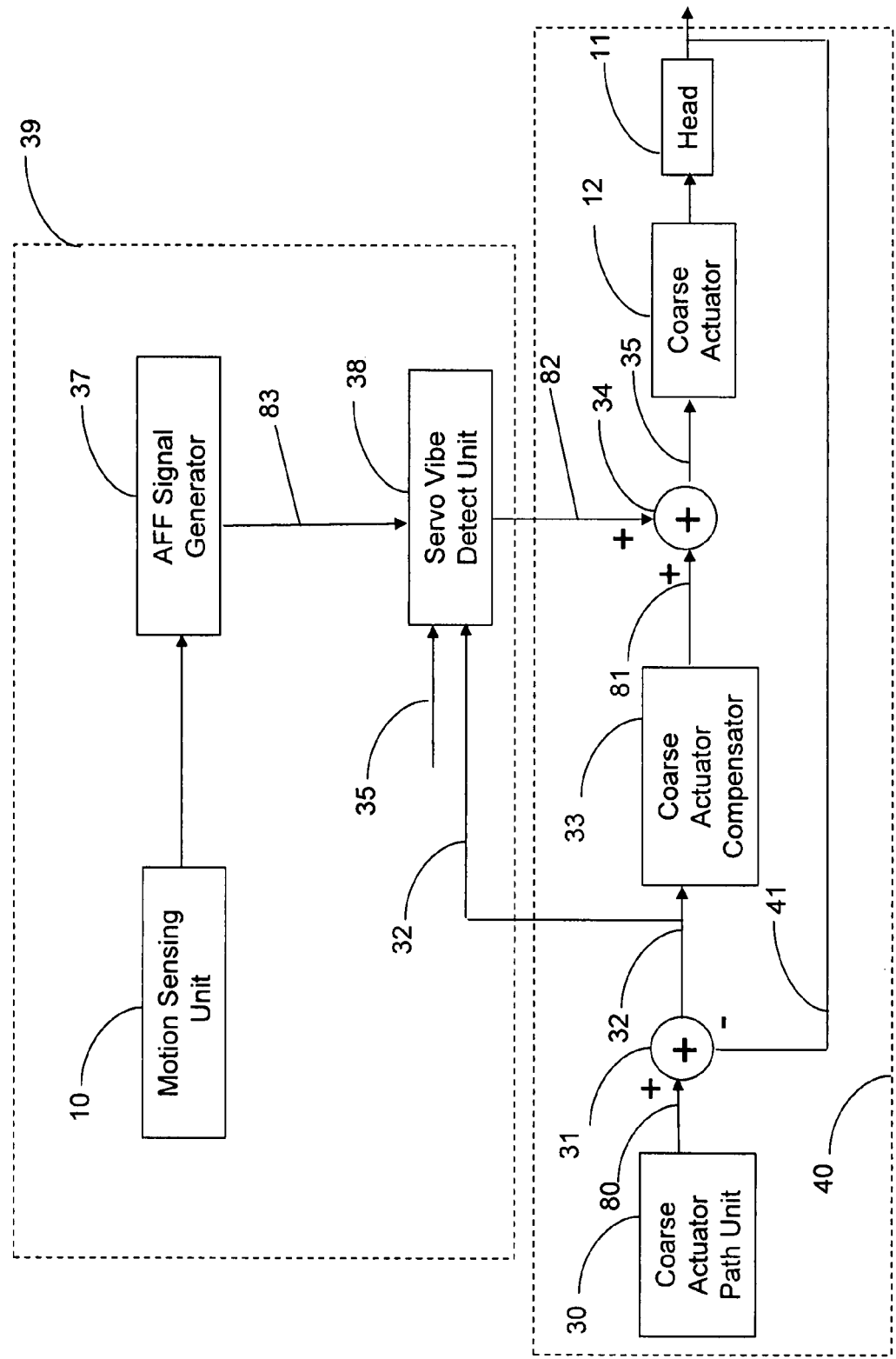
FIG. 3 illustrates a block diagram of a track follow loop and an acceleration feed-unit forward control unit of a servo controller in accordance with an embodiment of the present invention.

FIG. 3 shows a block diagram of a track follow loop 40 and an acceleration feed-forward (AFF) control unit 39 of the servo controller 18 (refer to FIG. 2) in accordance with an embodiment of the present invention. The components illustrated in FIG. 3 are just some of the components responsible for ultimately controlling the movement of the head 11. In the following discussion, portions of the track follow loop 40 and the acceleration feed-forward control unit 39 are described with reference to functional blocks and not discrete hardware elements. The functions may be implemented using one or more of hardware, software, and firmware. More than one function, or different parts of functions, may be combined in a given hardware, software, or firmware implementation.

The track follow loop 40 comprises a coarse actuator path unit 30, a first summing node 31, a coarse actuator compensator 33, a second summing node 34, the coarse actuator 12, and the head 11. The coarse actuator path unit 30 is configured to provide a coarse actuator reference trajectory signal 80 that specifies a reference trajectory for the coarse actuator 12. The reference trajectory for the coarse actuator 12 is a desired trajectory that the coarse actuator 12 should ideally follow to move the head 11 during a seek operation. In tracking mode, the coarse actuator path unit 30 serves to provide a reference signal to the coarse actuator 12 that helps maintain a position of the head 11 over a selected track.

According to FIG. 2 and FIG. 3, while in tracking mode, the head 11 reads data from the servo sectors of the plurality of servo sectors 26 on the disk 7, and provides the r/w channel 19 with a signal based on the read servo sector data. The r/w channel 19 processes this information and provides the servo controller 18 with information regarding the actual position of the head 11 with respect to a track of the one or more tracks. The actual position of the head 11 with respect to a track is then used as a feedback signal 41. The feedback signal 41 is subtracted from the reference trajectory signal 80 generated by the coarse actuator path unit 30 at summing node 31. The resulting output signal from summing node 31 is a position error signal (PES) 32. Thus, the PES 32 indicates a difference between a desired reference position of the head 11 and an actual position of the head 11.

The coarse actuator compensator 33 receives the position error signal 32 that is provided by the first summing node 31. The coarse actuator compensator 33 is configured to provide a coarse actuator compensation signal 81 based on the PES 32 that can be used to control the coarse actuator 12. The coarse actuator compensation signal 81 is then combined with a gated acceleration feed-forward (GAFF) signal 82 at the third summing node 34 to produce a current drive signal (CDS) 35 that controls the coarse actuator 12, and ultimately the position of the head 11.

The AFF control unit 39 comprises the motion sensing unit 10, an AFF signal generator 37, and a servo vibe detect unit 38. The motion sensing unit 10 sends information regarding an angular disturbance that the disk drive 1 is being subjected to in the plane of the disk 7, to the AFF signal generator 37. The AFF signal generator 37 then calculates an appropriate acceleration feed-forward (AFF) signal 83 needed to compensate for the disturbances. However, use of this acceleration feed forward signal 83 depends on the state of the servo vibe detect unit 38. If the servo vibe detect unit 38 is in an active state, the servo vibe detect unit 38 will allow the GAFF signal 82 to be equal to the AFF signal 83, so as to be added to the coarse actuator compensation signal 81 via summing node 34. If the servo vibe detect unit 38 is in an inactive state, the GAFF signal 82 will be equal to zero, and thus the coarse actuator will not be affected by the AFF signal 83.

The state of the servo vibe detect unit 38 may be a function of one or more signals within the track follow loop 40. In an embodiment of the present invention, the track follow loop signals that affect the state of the servo vibe detect unit 38 are the PES 32 and the CDS 35, although any signal along the track follow loop 40 may be used in determining when to enable or disable use of the AFF signal 83.

Figure 4:
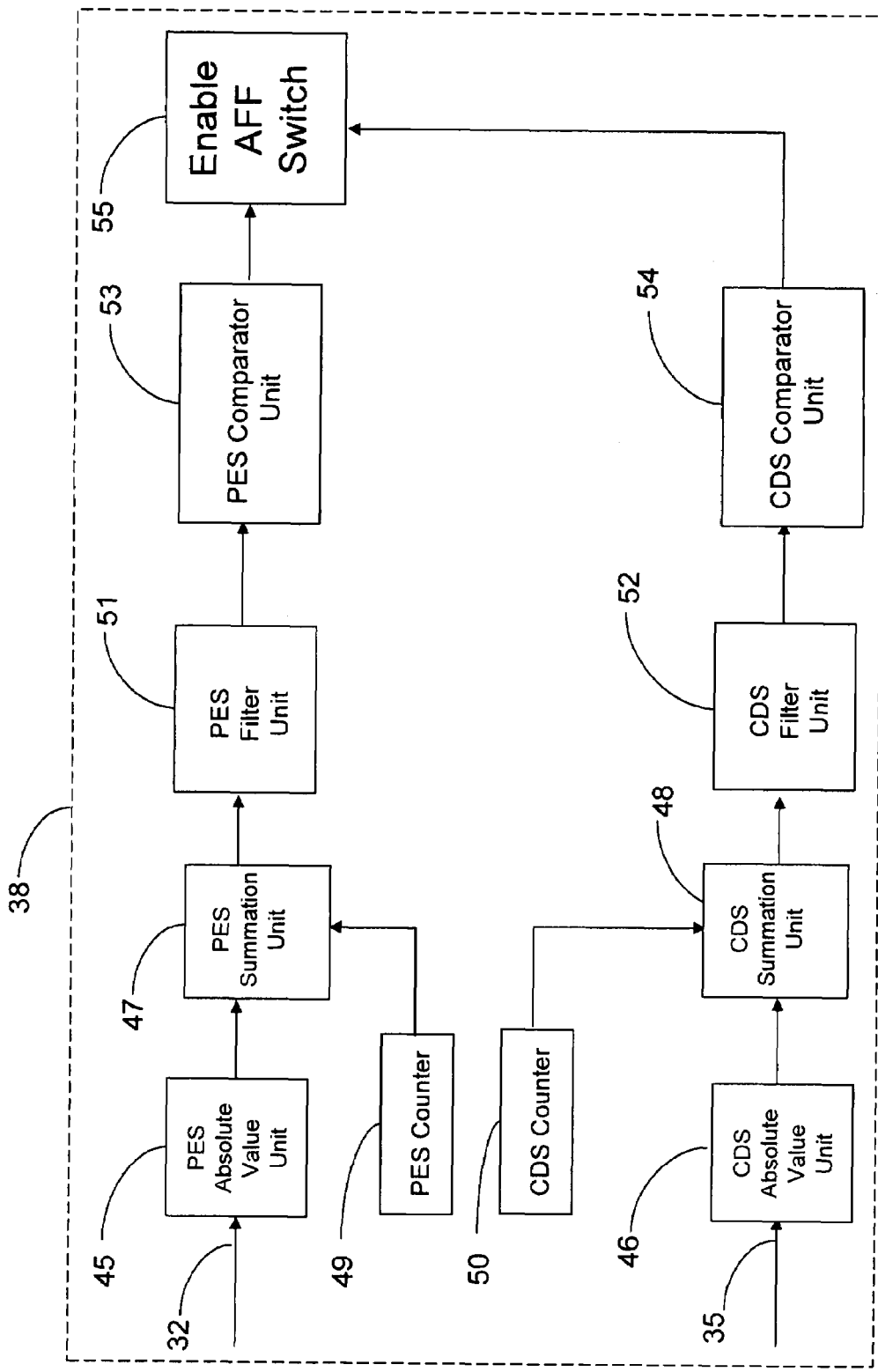
FIG. 4 illustrates a block diagram of a servo vibe detect unit of an embodiment of the present invention.

FIG. 4 shows a block diagram of how the state of the servo vibe detect unit 38 may be changed to active, enabling use of the AFF signal 83 (refer to FIG. 3). In the following discussion, the servo vibe detect unit 38, and its operation, is described with reference to functional blocks and not discrete hardware elements. The functions may be implemented using one or more of hardware, software, and firmware. More than one function, or different parts of functions, may be combined in a given hardware, software, or firmware implementation.

With reference to FIGS. 2, 3, and 4, while the disk drive 1 operates in tracking mode, the PES 32 and the CDS 35 values are generated and updated as the head 11 reads servo sector information pertaining to the actual location of the head 11 over the disk 7. These signal values may be updated at least once per servo sector of the plurality of servo sectors 26 located on the disk 7. An absolute value of each new PES 32 sample value and CDS 35 value generated is calculated and provided by PES absolute value unit 45 and CDS absolute value unit 46, respectively. An output of the PES absolute value unit 45, which represents an absolute value of the PES 32 sample value, is then fed into the PES summation unit 47. The PES summation unit 47 adds together the absolute values of the PES 32 sample values output by the PES absolute value unit 45.

A count of the PES counter 49 is decremented each time the PES summation unit 47 adds to its total another value output by the PES absolute value unit 45. The PES counter 49 starts counting down from a value that may be set to be equal to a number of servo sectors located along one track 24 around one revolution of the disk 7. The PES counter 49 expires when the count reaches zero, and upon expiration, the PES counter 49 sends a signal to the PES summation unit 47 to: (1) output its present total value to the PES filter unit 51; and (2) clear its total value to start anew for a next counter cycle counted by the PES counter 49. Thus, the PES summation unit 47 generates a sum value representing the total value of the absolute values of the PES 32 sample values output by the PES absolute value unit 45 within one PES counter 49 cycle.

Similarly, an output of the CDS absolute value unit 46, which represents an absolute value of the CDS 35 sample value, is then fed into the CDS summation unit 48. The CDS summation unit 48 adds together the absolute values of the CDS 35 sample values output by the CDS absolute value unit 46. A count of the CDS counter 50 is decremented each time the CDS summation unit 48 adds to its total another value output by the CDS absolute value unit 46. The CDS counter 50 starts counting down from a value that may be set to be equal, for example, to the number of servo sectors located around one revolution of one track 24 on disk 7. The CDS counter 50 expires when the count reaches zero, and upon expiration, the CDS counter 50 sends a signal to the CDS summation unit 48 to: (1) output its present total value to the CDS filter unit 52; and (2) clear its total value to start anew for a next counter cycle counted by the CDS counter 50. Thus, the CDS summation unit 48 generates a sum value representing the total value of the absolute values of the CDS 35 sample values output by the CDS absolute value unit 46 within one CDS counter 50 cycle.

The PES filter unit 51 may be any low pass filter, such as, an integrator, a Chebyshev filter, a Butterworth filter, or the like. The output of the PES filter unit 51 is then input into the PES comparator unit 53. The PES comparator unit 53 checks to see if any filter output value from the PES filter unit 51 exceeds some particular threshold value. The threshold value may be set manually to some fixed value, or may automatically be set and changed by the disk drive 1 to a higher or lower value depending on the hostility (strength and frequency of occurrence of vibratory events) of the environment the disk drive 1 is in. As long as the filter output values from the PES filter unit 51 remain less than the threshold value, the enable AFF switch 55 will not allow the GAFF signal 82 to be set equal to the AFF signal 83. However, if the threshold value is exceeded, a servo vibration condition is said to be detected. Then, the enable AFF switch 55 will allow the GAFF signal 82 to be equal to the AFF signal 83, so that it may be added to the coarse actuator compensator signal 81 via summing node 34.

Similarly, the CDS filter unit 52 may be any low pass filter, such as, an integrator, a Chebyshev filter, a Butterworth filter, or the like. The output of the CDS filter unit 52 is then input into the CDS comparator unit 54. The CDS comparator unit 54 checks to see if any filter output value from the CDS filter unit 52 exceeds some particular threshold value. The threshold value may be set manually to some fixed value, or may automatically be set and changed by the disk drive 1 to a higher or lower value depending on the hostility (strength and frequency of occurrence of vibratory events) of the environment the disk drive 1 is in. As long as the filter output values from the CDS filter unit 52 remain less than the particular threshold value, the enable AFF switch 55 will not allow the GAFF signal 82 to be equal to the AFF signal 83. However, if the particular threshold value is exceeded, a servo vibration condition is said to be detected. Consequently, the enable AFF switch 55 will allow the GAFF signal 82 to be set equal to the AFF signal 83, so that it may be added to the coarse actuator compensator signal 81 via summing node 34.

It is important to note that the processes of summing and filtering the PES 32 and CDS 35 sample values can be altered or replaced with any variety of processes that yield representations of the PES 32 and CDS 35 sample values that are less indicative of fleeting noise-like variations, and more indicative of actual vibrations or rotational forces being imparted on the disk drive 1. For example, instead of summing the absolute values of the PES 32 sample values and/or CDS 35 sample values, a variance calculating unit may generate variance values of the PES 32 sample values and/or the CDS 35 sample values. These variance values may then be filtered and then compared to threshold values. Also, the counter values of the PES counter 49 and CDS counter 50 can be changed from a number of servo sectors 26 along one revolution of a disk 7 to some ratio of a number of servo sectors 26 along one revolution of a disk 7. In addition, the threshold values of the PES comparator unit 53 and the CDS comparator unit 54 may be variable, that is, they may be increased or decreased either manually or automatically depending on the hostility of the environment the disk drive 1 is in, or the amount of protection the user desires.

In some embodiments of the present invention, only the PES 32 sample values are processed (summed, filtered, and compared to a threshold value) in determining whether to allow the GAFF signal 82 to be set equal to the AFF signal 83. In other embodiments, only the CDS 35 sample values are processed in determining whether to allow the GAFF signal 82 to be set equal to the AFF signal 83. Yet, in other embodiments, both the PES 32 sample values and the CDS 35 sample values are processed in determining whether to allow the GAFF signal 82 to be set equal to the AFF signal 83. In some embodiments of the present invention, both the PES filter 51 output values and the CDS filter 52 output values must exceed specific threshold values for the GAFF signal 82 to be set equal to the AFF signal 83. In yet other embodiments, if either the PES filter 51 output values or the CDS filter 52 output values exceed a specific threshold value, the GAFF signal 82 may be set equal to the AFF signal 83.

In an embodiment of the present invention, processing of the PES 32 and the CDS 35 sample values are suspended during seek operations. Processing may again be resumed from the same counter count of the PES counter 49 and the CDS counter 50 once the disk drive 1 re-enters tracking mode, without having to discard previously calculated PES 32 and CDS 35 sample values of a partial disk rotation. To illustrate, the head 11 might be situated over a particular track, among the one or more tracks 24 on the disk 7, performing a read operation. During this time, the PES 32 and CDS 35 sample values may be processed, for example, for half a disk revolution as the head 11 completes its read task and moves to a different track. While the head 11 is seeking a new track, the counter values of the PES counter 49 and the CDS counter 50 and processing of the PES 32 and CDS 35 sample values may be suspended. Once the head 11 settles on its new track destination, processing of the PES 32 and CDS 35 sample values may resume at the same counter count, such that only half a disk revolution is left to produce a total value output from the PES summation unit 47 and a total output value from the CDS summation unit 48. Thus, processing of the PES 32 and CDS 35 values for one revolution of the disk 7 may not be fixed to disk position because processing may resume from a different location on the disk 7 from where it originally left off. Resuming processing in this fashion may be more efficient in that the summation process would not have to restart from a value of zero every time the head 11 moves to a different track.

In an embodiment of the present invention, processing of the PES 32 and the CDS 35 sample values are suspended during an error condition. An error condition may be present anytime the disk drive 1 enters a state deemed to be inoperable, for example, the head 11 exceeds a specific boundary along a track 24 during a read or write operation. Processing of the PES 32 and the CDS 35 sample values may resume from a same counter count of the PES counter 49 and of the CDS counter 50, such as described above for suspension during seek operations, once the error condition is removed.

Yet in other embodiments, the state of the servo vibe detect unit 38 may be allowed to become active only when the disk drive 1 is in a read or write retry state. The disk drive 1 may enter a read or write retry state when it has previously failed to perform a requested read or write operation, and is reattempting the same operation. In alternative embodiments, the state of the servo vibe detect unit 38 may become active only when both the disk drive 1 is in a read or write retry state and a servo vibration condition is detected. This would allow for restricting the use of the AFF signal 83 to situations where the external disturbances acting on the disk drive 1 are the likely cause for the failed read or write attempts.

In some embodiments of the present invention, once a servo vibration condition is detected and the state of the servo vibe detect unit 38 is set active, the state of the servo vibe detect unit 38 may become inactive after a certain number of consecutive summed and filtered PES and CDS values fall below some specific threshold value. In some embodiments this specific threshold value is a same value as a value used to detect whether a servo vibration condition existed. In other embodiments this specific threshold value may be higher or lower than the original threshold value used to detect whether a servo vibration condition existed.

In various embodiments of the present invention, once a servo vibration condition is detected and the state of the servo vibe detect unit 38 is set active, the state of the servo vibe detect unit 38 may become inactive after a certain percentage of summed and filtered PES and CDS values within some counter period fall below some specific threshold value. In some embodiments this specific threshold value is a same value used to detect whether a servo vibration condition existed. In other embodiments this specific threshold value may be higher or lower than the original threshold value used to detect whether a servo vibration condition existed.

In yet other embodiments of the present invention, once a servo vibration condition is detected and the state of the servo vibe detect unit 38 is set active, the state of the servo vibe detect unit 38 will remain active for some period of time known as a timeout period. After expiration of the timeout period, the servo vibration condition must be re-detected before the GAFF signal 82 is set equal to the AFF signal 83 so as to be added to the coarse actuator compensator signal 81. The timeout period may start at a default period of, for example, 30 seconds or the like, and then later be raised or lowered by either the user, or automatically by the disk drive 1 itself if the disk drive 1 is subjected to a hostile environment (one with frequent or strong disruptive forces). Such a timeout period reduces a probability of the state of the servo vibe detect unit 38 from toggling back and forth between active and inactive states. It also may obviate the complication of having to add hysteresis to the PES comparator unit 53 and CDS comparator unit 54 threshold values.

Hysteresis is a method of temporarily lowering the threshold values of the comparator units 53, 54 until the PES filter 51 output values and the CDS filter 52 output values fall below the temporarily lowered threshold values. This typically helps to prevent toggling between active and inactive states by providing some margin for the filter 51, 52 output values to vary in.

In yet other embodiments, the GAFF signal 82 may be set equal to the AFF signal 83 by processing other track follow loop signals besides the PES 32 samples and CDS 35 samples, for example, the coarse actuator compensator signal 81.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. An acceleration feed-forward (AFF) system comprising:
an acceleration feed-forward (AFF) unit configured to selectively provide an AFF signal in response to a storage system employing the acceleration feed-forward (AFF) system being in a read or write retry state; and
a track follow system for at least partially controlling motion of an actuator relative to the selected track of the storage medium, based on the acceleration feed-forward (AFF) signal.

2. The system of claim 1,
wherein the acceleration feed-forward (AFF) unit is configured to selectively provide an AFF signal based on track follow loop signal samples, and
wherein the track follow loop signal samples are position error signal (PES) samples.

3. A storage system comprising:
a storage medium having a surface with one or more tracks for storing data;
a read/write device for reading data from the storage medium and/or for writing data to the storage medium;
an actuator for positioning the read/write device relative to a selected track of the one or more tracks;
a sensor for providing a signal based on the sensed forces; and
an acceleration feed-forward (AFF) system as recited in claim 1, for providing an AFF signal based on the signal provided by the sensor.

4. An acceleration feed-forward (AFF) system comprising:
an acceleration feed-forward (AFF) unit configured to selectively provide an AFF signal based on track follow loop signal samples; and
a track follow system for at least partially controlling motion of an actuator relative to the selected track of the storage medium, based on the acceleration feed-forward (AFF) signal,
wherein the track follow loop signal samples are current drive signal (CDS) samples.

5. The system of claim 4, wherein the track follow loop signal samples further include position error signal (PES) samples.

6. An acceleration feed-forward (AFF) system comprising:
an acceleration feed-forward (AFF) unit configured to selectively provide an AFF signal based on track follow loop signal samples; and
a track follow system for at least partially controlling motion of an actuator relative to the selected track of the storage medium, based on the acceleration feed-forward (AFF) signal,
wherein the acceleration feed-forward (AFF) unit comprises:
a counter having a counter cycle for counting from an initial value;
an absolute value unit for providing an absolute value of the track follow loop signal samples;
a summation unit for generating a sum value representing the total value of the absolute values of the track follow loop signal samples added together within one counter cycle;
a filter unit configured to provide output values from one or more sum values generated by the summation unit;
a comparator unit for comparing the filter output values with a threshold value;
wherein the AFF unit provides the AFF signal if one or more filter output values exceed the threshold value so that the actuator is able to be at least partially controlled by the AFF signal.

7. The system of claim 6, wherein the counter count is altered each time the summation unit adds the absolute value of a track follow loop signal sample to the sum value, and is reset to the initial value when the counter count reaches a predefined value.

8. The system of claim 6, wherein:
while the storage system is in a seek mode, addition of the absolute value of the track follow loop signal samples by the summation unit is suspended, the counter has a count value that remains constant, filtering by the filter unit is suspended, and comparing of the filter output values to the threshold value by the comparator unit is suspended;
upon the storage system re-entering a tracking mode, addition of the absolute value of the track follow loop signal samples by the summation unit resumes, the counter count value continues to decrement from the same counter count when last suspended, filtering by the filter unit resumes, and comparing of the filter output values to the threshold value resumes.

9. The system of claim 6, wherein:
while an error condition is present, addition of the absolute value of the track follow loop signal samples by the summation unit is suspended, the counter count value remains constant, filtering by the filter unit is suspended, and comparing of the filter output values to the threshold value is suspended;
upon removal of the error condition, addition of the absolute value of the track follow loop signal samples by the summation unit resumes, the counter count value continues to decrement from the same counter count when last suspended, filtering by the filter unit resumes, and comparing of the filter output values to the threshold value resumes.

10. The system of claim 6, wherein the threshold value is automatically adjusted based on the hostility of the environment the magnetic storage system is in.

11. The system of claim 6, wherein the initial value of the counter is equal to the number of servo sectors around one disk revolution along one track.

12. The system of claim 6, wherein the filter is a low-pass filter.

13. An acceleration feed-forward (AFF) system comprising:
- an acceleration feed-forward (AFF) unit configured to selectively provide an AFF signal based on track follow loop signal samples; and
- a track follow system for at least partially controlling motion of an actuator relative to the selected track of the storage medium, based on the acceleration feed-forward (AFF) signal,
- wherein the track follow loop signal samples are coarse actuator compensator signal samples.

14. An acceleration feed-forward (AFF) system comprising:
- an acceleration feed-forward (AFF) unit configured to selectively provide an AFF signal based on track follow loop signal samples; and
- a track follow system for at least partially controlling motion of an actuator relative to the selected track of the storage medium, based on the acceleration feed-forward (AFF) signal,
- wherein the AFF unit comprises:
  - a variance calculating unit that generates a variance value of more than one of the track follow loop signal samples;
  - a filter unit configured to provide filter output values by filtering one or more variance values generated by the variance calculating unit;
  - a comparator unit for comparing the filter output values with an adjustable threshold value;
  - wherein the AFF unit provides the AFF signal if one or more filter output values exceed the threshold value so that the coarse actuator is able to be at least partially controlled by the AFF signal.

15. The system of claim 14, wherein the more than one of the track follow loop signal samples are position error signal (PES) samples and current drive signal (CDS) samples.

16. An acceleration feed-forward (AFF) system comprising:
- an acceleration feed-forward (AFF) unit configured to selectively provide an AFF signal based on track follow loop signal samples; and
- a track follow system for at least partially controlling motion of an actuator relative to the selected track of the storage medium, based on the acceleration feed-forward (AFF) signal,
- wherein in the event that the AFF unit provides the AFF signal so that the actuator is able to be at least partially controlled by the AFF signal, the AFF unit stops providing the AFF signal after a period of time, the period of time being adjustable.

17. The system of claim 16, wherein the period time is automatically adjusted based on the hostility of the environment of the system is in.

18. A method for providing an acceleration feed-forward (AFF) signal to compensate for any disturbances to a position of a head of a storage system relative to a selected track of a storage medium, the method comprising:
- selectively providing an acceleration feed-forward (AFF) signal in response to a storage system employing the method being in a read or write retry state; and
- at least partially controlling motion of an actuator relative to the selected track of the storage medium, based on the acceleration feed-forward (AFF) signal.

19. The method of claim 18, wherein selectively providing an AFF signal comprises providing an AFF signal based on track follow loop signal samples and wherein the track follow loop signal samples are one or both of position error signal (PES) samples and current drive signal (CDS) samples.

* * * * *